United States Patent
Sharma et al.

(10) Patent No.: US 10,850,225 B2
(45) Date of Patent: Dec. 1, 2020

(54) PROCESSES FOR REMOVING HEAVY HYDROCARBONS AND WATER FROM A STREAM OF NATURAL GAS

(71) Applicant: UOP LLC, Des Plaines, IL (US)

(72) Inventors: Bhargav Sharma, Katy, TX (US);
Nagaraju Palla, Woodridge, IL (US);
Trevor Smith, Northbrook, IL (US);
Shain-Jer Doong, Kildeer, IL (US)

(73) Assignee: UOP LLC, Des Plaines, IL (US)

( * ) Notice: Subject to any disclaimer, the term of this patent is extended or adjusted under 35 U.S.C. 154(b) by 223 days.

(21) Appl. No.: 16/037,290

(22) Filed: Jul. 17, 2018

(65) Prior Publication Data

US 2019/0184329 A1 Jun. 20, 2019

(51) Int. Cl.
*B01D 53/04* (2006.01)
*C10L 3/10* (2006.01)

(52) U.S. Cl.
CPC ..... *B01D 53/0462* (2013.01); *B01D 53/0407* (2013.01); *B01D 53/0423* (2013.01); *C10L 3/101* (2013.01); *C10L 3/106* (2013.01); *B01D 2253/102* (2013.01); *B01D 2253/108* (2013.01); *B01D 2253/116* (2013.01); *B01D 2256/245* (2013.01); *B01D 2257/702* (2013.01); *B01D 2257/80* (2013.01); *B01D 2259/4145* (2013.01); *C10L 2290/542* (2013.01); *C10L 2290/60* (2013.01)

(58) Field of Classification Search
CPC .. B01D 53/265; B01D 53/04; B01D 53/0407; B01D 53/0462; B01D 2257/80; B01D 2257/702; B01D 2259/4145; B01D 2259/4146; B01D 2259/4148; C10L 3/10; C10L 3/101; C10L 3/106; E21B 43/36; E21B 43/40
USPC ........ 95/8, 117–120, 126, 114, 143; 96/131, 96/132; 585/820
See application file for complete search history.

(56) References Cited

U.S. PATENT DOCUMENTS

| | | | |
|---|---|---|---|
| 7,396,388 B2 | 7/2008 | Mitariten | |
| 7,442,233 B2 * | 10/2008 | Mitariten | B01D 53/0462 423/228 |
| 8,685,146 B2 | 4/2014 | Zhou et al. | |
| 8,778,050 B2 * | 7/2014 | Dolan | C10L 3/101 95/96 |
| 9,662,609 B2 | 5/2017 | Cnop et al. | |
| 2010/0242722 A1 * | 9/2010 | Belanger | B01D 53/0462 95/8 |
| 2010/0263532 A1 * | 10/2010 | Thomas | B01D 53/04 95/117 |

(Continued)

OTHER PUBLICATIONS

Mitariten et al., "The Sorbead™ Quick-Cycle Process for Simultaneous Removal of Water, Heavy Hydrocarbons and Mercaptans from Natural Gas," Laurance Reid Gas Conditioning Conference, Dated: Feb. 25-27, 2007.

(Continued)

*Primary Examiner* — Frank M Lawrence, Jr.

(57) ABSTRACT

Process for retrofitting existing processing units for natural gas fee streams. A portion of the dehydration adsorbent is removed from the vessels of the dehydration unit and is replaced with an adsorbent for heavy hydrocarbons. In operation the vessels are operated in thermal swing adsorption processes with reduced cycle times compared to the original design.

19 Claims, 2 Drawing Sheets

(56) References Cited

U.S. PATENT DOCUMENTS

Figure 1:
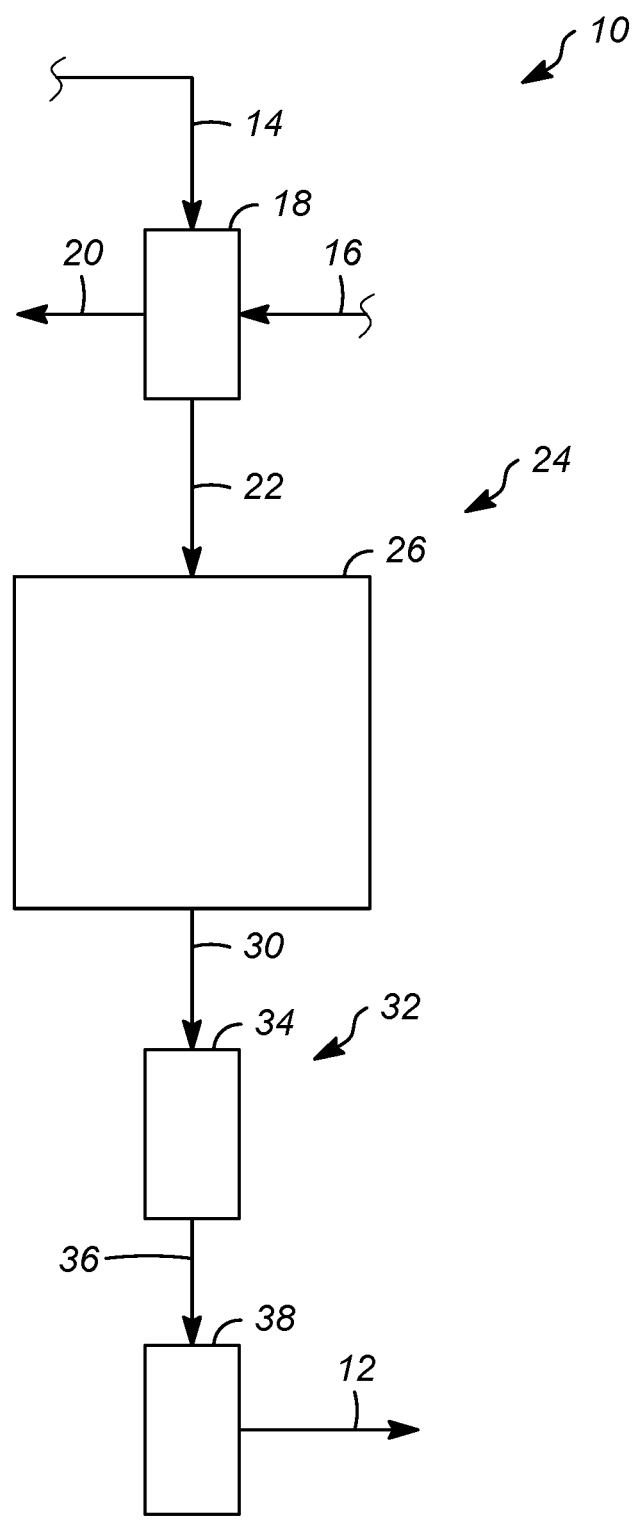

2014/0230650 A1* 8/2014 Sheu ............... B01D 53/04
                                                    95/119
2014/0345320 A1   11/2014 Xuan et al.

OTHER PUBLICATIONS

Siirtec Nigi (Company web page); "Gas Dew Point Control," https://www.siirtecnigi.com/design-gas-dew-point, retrieved Apr. 27, 2018.

Smith et al., "Selective C5+ Removal for Lean Feed Gas," LNGIndustry, Feb. 2016.

International Search Report and Written Opinion for corresponding International Application PCT/US2019/042187, dated Oct. 31, 2019.

* cited by examiner

PROCESSES FOR REMOVING HEAVY HYDROCARBONS AND WATER FROM A STREAM OF NATURAL GAS

FIELD OF THE INVENTION

This invention relates generally to processes for removing contaminants from a natural gas feed stream, and more particularly to processes for retrofitting, or revamping, existing processing systems in order to effectively and efficiently remove heavy hydrocarbons from a natural gas feed stream that is lean in heavy hydrocarbons.

BACKGROUND OF THE INVENTION

Natural gas, which primarily includes methane, has grown into a viable alternative energy source to petroleum over recent years, especially in the United States, due to drastic increases in proven worldwide and domestic reserves and due to a desire for increased energy independence. Many natural gas reserves, however, are characterized as sub-quality due to the presence of compounds other than methane therein. While high-quality natural gas reserves may require less processing for commercialization, the sub-quality natural gas reserves are generally significantly cheaper sources of natural gas. In addition, the sub-quality natural gas reserves provide cost-savings opportunities as more efficient processing techniques are developed to process the natural gas from the reserves for commercialization.

One processing consideration for commercializing natural gas involves liquifying the natural gas, which provides ease of storage and transport and which can decrease a volume of the natural gas by up to 600 times. High-quality natural gas reserves may be liquified with relative ease. However, difficulties with liquifying natural gas from sub-quality natural gas reserves persist due to the presence of compounds other than methane. In particular, compounds that freeze at higher temperatures than a boiling point of methane may be present in the sub-quality natural gas reserves and may freeze during liquefaction of the natural gas, thereby causing plugging and blockage in pipes during liquefaction. Examples of compounds that may be present in the natural gas and that may freeze during liquefaction include benzene, toluene, xylene, cyclohexane, and neopentane. Neopentane is particularly problematic due to its high freezing point of about $-17°$ C., which will generally result in freezing during liquefaction of the natural gas, and due to its lower molecular weight and unique spherical molecular structure compared to benzene, toluene, and xylene, which makes neopentane more difficult to separate from the natural gas than benzene, toluene, and xylene.

In newly constructed processing plants, new designs have been provided which may be used to efficiently and effectively remove compounds, specifically heavy hydrocarbons, from natural gas. One such example is disclosed in U.S. Pat. No. 8,65,146, the entirety of which is incorporated herein by reference. However, in older processing plants that produce liquified natural gas, the existing processing schemes are believed to be ineffective in feed streams that are lean in heavy hydrocarbons.

Specifically, the feed gas to older processing plants is typically lean in heavy hydrocarbons with a small amount of C6+ hydrocarbons present. In such older processing plants, a traditional pre-treatment processing for the feed gas includes acid gas removal, water removal, and heavy hydrocarbon removal. The pre-treatment scheme involves removal of water with adsorbents and removal of heavy hydrocarbons with a fractionation column. It is believed that for leaner feed gas, there is insufficient C2-C4 reflux to remove heavy components effectively or efficiently. This can lead to the freezing of the cold section due to heavies/benzene slippage in an existing system. Due to the freezing, operating plants may have to be shut down frequently to alleviate the problems caused by the heavy hydrocarbon accumulation in the heat exchanger.

It would be desirable to minimize or avoid the freezing so that the older processing plants efficiently and effectively process feed gas that is lean in heavy hydrocarbons.

SUMMARY OF THE INVENTION

One or more processes have been invented which address the above identified drawbacks. Specifically, the present processes provide for the retrofitting of existing processing plants to allow the processing plants to efficiently and effectively process feed gas that is lean in heavy hydrocarbons.

According to the processes of the present invention, the existing dehydration unit, having a first adsorbent for water, is retrofitted with a second adsorbent to also remove heavy hydrocarbons. This system is envisioned to work in with natural gas feed streams that are lean with heavy hydrocarbons but where there is still a need to remove the heavy hydrocarbons to a desired level. In addition to changing some of the adsorbent associated with the dehydration unit, processes of the present invention also alter the cycle time and operation of the dehydration uni.

Specifically, current dehydration units are typically operated in a thermal swing adsorption processes in alternating periods of adsorption/desorption with long cycle times (24 hour plus). Many heavy hydrocarbon adsorbents are operated in thermal swing adsorption processes with a relatively fast cycle time (between 30 mins-2 hours) and with internally insulated vessels to minimize the use of desorption gas. It should be appreciated that these two types of cycle times (long v. short) would not typically be interchanged for the different types of adsorbents since shortened cycle time negatively impacts the adsorbent's useful life. By lowering the cycle time associated with current dehydration units, contrary to conventional thinking, and by using a longer cycle time for the heavy hydrocarbon adsorbents, the retrofitted dehydration unit is believed to efficiently and effectively remove both water and heavy hydrocarbons, allowing for the processing of the feed stream with less chance that heavy hydrocarbons slip through and cause freezing in the downstream processing.

The replacement adsorbent may be added to either the top, the bottom or it may be sandwiched in the middle of the adsorbent beds. The amount of heavy hydrocarbon adsorbent may be between 5 and 95%, by volume, or between 15 to 75%, by volume, and preferably is at least greater than 15% so long as the dehydration unit is still configured to remove water to a sufficient level (0.1 ppmv) downstream processing.

Additionally, any heavy hydrocarbons that are recovered from the dehydration unit, for example condensed in a knockout drum may be sent to condensate stabilizer (depending upon type of heavies removed) or recycled back to the feed.

Therefore, the present invention may be characterized, in at least one aspect, as providing a process for revamping an existing dehydration unit including at least one vessel surrounding a bed of first adsorbent particles, the first adsorbent particles having a preferential selection for adsorbing water by: removing a portion of the first adsorbent particles from the bed of dehydration adsorbent particles in the vessel; placing a plurality of second adsorbent particles into the vessel, wherein the second adsorbent particles adsorb heavy hydrocarbons; passing a stream of natural gas to the vessel; and, recovering a dehydrated stream of natural gas from the vessel, wherein the dehydrated stream of natural gas has a lower amount of heavy hydrocarbons compared to the stream of natural gas.

It is contemplated that the stream of natural gas comprises of less than 0.25 mole % C5+ hydrocarbons.

It is also contemplated that at least about 15%, by volume, of the first adsorbent particles are removed from the bed.

It is also contemplated that the second adsorbent particles also adsorb water. Additionally, the first adsorbent particles may be a molecular sieve adsorbent. The second adsorbent particles may be an adsorbent selected from the group consisting of: activated alumina, high silica zeolite, silica gel, activated carbon, molecular sieve or zeolite adsorbent.

It is also contemplated that the second adsorbent particles are placed into the vessel such that the second adsorbent particles are disposed on top of the first adsorbent particles.

It is further contemplated that the second adsorbent particles are placed into the vessel such that the second adsorbent particles are disposed below the first adsorbent particles.

It is contemplated that the second adsorbent particles are placed into the vessel such that the second adsorbent particles are disposed between layers of the first adsorbent particles.

The present invention may also be characterized, in at least one aspect, as providing a thermal swing adsorption process for removing heavy hydrocarbons and water from a stream of natural gas by: passing a stream of natural gas to a dehydration unit comprising at least one vessel surrounding a bed of first adsorbent particles; operating the vessel under conditions for selectively adsorbing water from the stream of natural gas for a first period of time; recovering a dehydrated stream of natural gas from the vessel; removing a portion of the first adsorbent particles from the bed of dehydration adsorbent particles in the vessel; placing a plurality of second adsorbent particles into the vessel, wherein the second adsorbent particles have a preferential selection for adsorbing heavy hydrocarbons; passing the stream of natural gas to the vessel; operating the vessel under conditions for selectively adsorbing heavy hydrocarbons and water from the stream of natural gas for a second period of time; and, recovering a dehydrated and hydrocarbon dew-pointed stream of natural gas from the vessel.

It is contemplated that the second period of time comprises 15% less than the first period of time.

It is also contemplated that the second adsorbent particles also have a preferential selection for adsorbing water.

It is further contemplated that approximately 15%, by volume, of the first adsorbent particles are removed from the bed.

It is contemplated that the first adsorbent particles comprise a molecular sieve adsorbent. The second adsorbent particles may be an adsorbent selected from the group consisting of: activated alumina, high silica zeolite, silica gel, activated carbon, molecular sieve or zeolite adsorbent.

It is further contemplated that the stream of natural gas comprises less than 0.25 mole % C5+ hydrocarbons.

It is further contemplated that the second adsorbent particles are placed into the vessel such that the second adsorbent particles are disposed on top of the first adsorbent particles.

It is contemplated that the second adsorbent particles are placed into the vessel such that the second adsorbent particles are disposed below the first adsorbent particles.

It is also contemplated that the second adsorbent particles are placed into the vessel such that the second adsorbent particles are disposed between layers of the first adsorbent particles.

It is contemplated that the process further includes: sensing at least one parameter of the process and generating a signal or data from the sensing; generating and transmitting a signal; or generating and transmitting data.

Additional aspects, embodiments, and details of the invention, all of which may be combinable in any manner, are set forth in the following detailed description of the invention.

DETAILED DESCRIPTION OF THE DRAWINGS

Figure 2A:
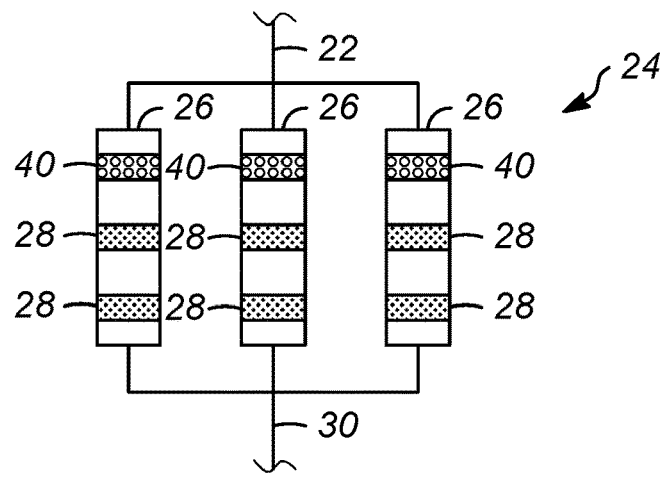
Figure 2B:
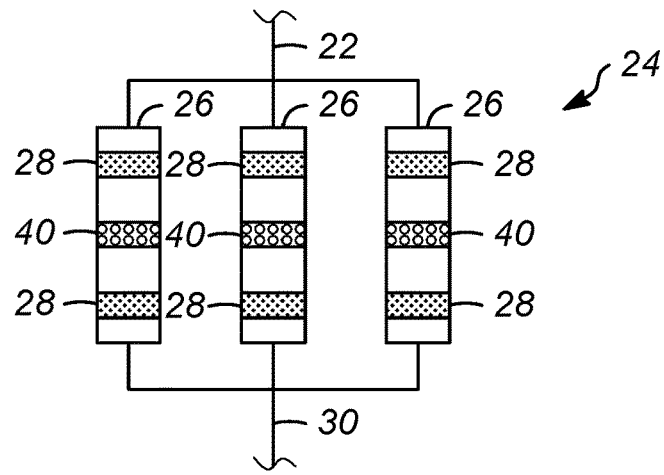
Figure 2C:
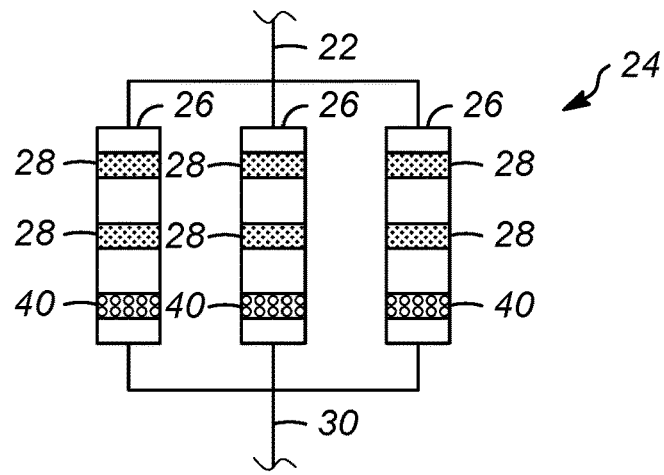

One or more exemplary embodiments of the present invention will be described below in conjunction with the following drawing figures, in which:

FIG. 1 depicts a liquefied natural gas processing unit used in association with one or more processes of the present invention; and, FIGS. 2A-2C depict various embodiments of the adsorbent beds in vessels in the dehydration unit of the natural gas processing unit shown in FIG. 1.

DETAILED DESCRIPTION OF THE INVENTION

As mentioned above, the present invention provides one or more processes for revamping or repurposing an existing pretreatment processing zone for liquefied natural gas processing unit in order to be able to effectively and efficiently process a feed gas that is lean in heavy hydrocarbons. As used herein "heavy hydrocarbons" means C5+ hydrocarbons include benzene, toluene, ethylbenzene and xylene. Additionally, as used herein, "lean" with respect to heavy hydrocarbons means that the natural gas stream has less than about 2 GPM heavy hydrocarbons. As used herein, "GPM" means gallons (3.79 liters) per 1000 standard cubic foot (scf) (approximately 28.3 standard cubic meters). According to the various embodiments of the present invention, the processes include removing a portion of a dehydration adsorbent and providing an adsorbent that has an affinity for adsorption heavy hydrocarbons. The bed, with the two different adsorbents, may be operated in a thermal swing adsorption process with cycles times that are reduced compared with the original dehydration unit cycle times.

With these general principles in mind, one or more embodiments of the present invention will be described with the understanding that the following description is not intended to be limiting.

An exemplary liquefied natural gas processing unit 10 for preparing a liquified natural gas 12 from a natural gas feed 14 is shown in FIG. 1. Referring to FIG. 1, acid gas may be removed from the natural gas feed 14 by contacting the natural gas feed 14 with an aqueous amine solution 16 in an amine process unit 18. Amine process units 18 are known in the art. In the amine process unit 18, acid gas reacts with the aqueous amine solution 16 to form weak chemical bonds with the aqueous amine solution 16 at high pressure, while the other components of the natural gas feed 14 remain in gaseous form. The aqueous amine solution 16, which carries with it the acid gases, is then remediated to separate an acid gas stream 20 therefrom, while acid lean natural gas feed 22 is further processes as described below. The acid lean natural gas feed 22 includes water, either naturally and/or as a result of contacting the natural gas feed 14 with the aqueous amine solution 16.

Accordingly, the acid lean natural gas feed 22 is typically passed to a dehydration unit 24. The dehydration unit includes one or more multiple vessels 26 that include a first absorbent 28 (see, FIGS. 2A-2C) for adsorbing water. As is known, the vessels 26 are operated in alternating conditions of adsorption and desorption, in a thermal swing adsorption process. Indicated above, the cycle times for the vessels 26 in the adsorption/desorption operating conditions are typically 24 hours.

The vessels 26 usually contain multiple beds with the first adsorbent particles 28 for removing water from the natural gas feed 14 to a level that is acceptable (typically less than 0.1 ppmv) to avoid or minimize the chances of water freezing in downstream processing. The first adsorbent particles 28 may be a molecular sieve such as a zeolite molecular sieves. The sodium form of Type A zeolite (also called 4A or NaA) is one such adsorbent because the sodium cation produces a crystalline lattice that has a high selectivity and affinity with water, and the A type structure has a large open space and therefore has a high capacity. Once the 4A zeolite is saturated with water, it must be thermally regenerated to restore it to its activated state so it may be used again for dehydration. As mentioned above, zeolite beds are therefore designed with long cycles to minimize the number of regeneration cycles in order to extend the useful life of the molecular sieve for as long as possible. The molecular sieve adsorbents are well known in the art. One such exemplary adsorbent is the 4A MOLSIV™ Adsorbent available from UOP LLC, Des Plaines, Ill.

A dehydrated natural gas feed 30 is recovered from the dehydration unit 24 and passed to a fractionation section 32 to remove C5+ hydrocarbons. The fractionation section 32 includes one more vessel 34 configured to remove C5+ hydrocarbons from the lighter hydrocarbons based on boiling points.

A C5+ lean natural gas feed 36, comprising a dew-pointed hydrocarbon stream, is then passed to a liquifying stage 38 which may include conventional equipment for cooling the C5+ lean natural gas feed 36 to sufficiently low temperatures for liquefaction. The cooling of the C5+ lean natural gas feed 36 results in the production of the liquified natural gas stream 12.

As mentioned above, when the natural gas feed 14 is lean in heavy hydrocarbons, or when the natural gas feed 14 comprises less than 0.25 mole % C5+ hydrocarbons, there is the potential for equipment with the older processing units to freeze due to the presence of some heavy hydrocarbons in the gas stream downstream of the fractionation section 32. Accordingly, as shown in FIGS. 2A-2C, in the processes of the present invention, a portion of the first adsorbent particles 28 in the vessels 26 of the dehydration unit 24 is removed and replaced with second adsorbent particles 40 having a selectivity for heavy hydrocarbons.

The second adsorbent particles 40 may be activated alumina, high silica zeolite, silica gel, activated carbon, molecular sieve or zeolite adsorbent or other adsorbents known for adsorbing heavy hydrocarbons such as benzene, toluene, and xylene from natural gas streams. Such adsorbents are disclosed in U.S. Pat. No. 8,685,146, the entirety of which his incorporated herein by reference. It is preferred that the adsorbents also allow all of adsorbed particles to be desorbed. In addition to adsorbing heavy hydrocarbons, the second adsorbent particles 40 may also adsorb water.

The amount of the first adsorbent particles 28 that are removed may range between 5 and 95%, by volume, or between 15 to 75%, by volume. For example, at least about 15%, by volume, of the first adsorbent particles 28 are removed from each vessel 26. Again, the remaining amount of first adsorbent particles 28 should be sufficient to remove sufficient water so as to achieve the desired level of water for further processing of the natural gas stream.

As shown in FIG. 2A, the second adsorbent particles 40 may be placed into the vessels 26 such that the second adsorbent particles 40 are disposed on top of the first adsorbent particles 28. Alternatively, as shown in FIGS. 2B and 2C, the second adsorbent particles 40 may be placed into each of the vessels 26 such that the second adsorbent particles 40 are disposed below a layer of first adsorbent particles 26. As shown in FIG. 2B, it is also contemplated that the second adsorbent particles 40 may be placed into the vessels 26 such that the second adsorbent particles 40 are disposed between layers of the first adsorbent particles 28. Finally, in FIG. 2C, the second adsorbent particles 40 are the bottommost layer in the vessels 26. Although not depicted as such, it is contemplated that the arrangement of the different adsorbent particles 28, 40 is different in between the different vessels 26 in the dehydration unit 24. Furthermore, although three vessels 26 are shown in the dehydration unit 24, any number of vessels 26 may be used.

As indicated above, in addition to replacing a portion of the first adsorbent particles 28 with the second adsorbent particles 40, the processes of the present invention include reducing the cycle times for the dehydration unit. The reduction in the cycle time may be between 10 to 80%, or between 25 to 55%, or, for example at least 15% less than the original cycle time for vessels of the dehydration section. The exact amount of the reduction in cycle time will depend on different variables including the capacity of adsorbents to load a specific component.

The natural gas stream passed to the vessels during processing of a feed stream will have water and heavy hydrocarbons removed within the same vessel. The stream from the vessels with be a dehydrated stream that has a reduced amount of heavy hydrocarbons compared to amount of heavy hydrocarbons in the stream as it is passed into the vessel.

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein. For example, the processes can obtain data relative to the heavy hydrocarbon amounts in the feed stream and then adjust the cycle times for the adsorption/desorption based on generation, transmission, and/or reception of a signal relating to the heavy hydrocarbon level of the feed stream.

Based on these changes, it is believed that older existing processing units can be retrofitted to effectively and efficiently provide a natural gas stream that has a lower amount of heavy hydrocarbons than the feed stream.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understanding the embodiments of the present invention.

Specific Embodiments

While the following is described in conjunction with specific embodiments, it will be understood that this description is intended to illustrate and not limit the scope of the preceding description and the appended claims.

A first embodiment of the invention is a process for revamping an existing dehydration unit including at least one vessel surrounding a bed of first adsorbent particles, the first adsorbent particles having a preferential selection for adsorbing water, and the process comprising removing a portion of the first adsorbent particles from the bed of dehydration adsorbent particles in the vessel; placing a plurality of second adsorbent particles into the vessel, wherein the second adsorbent particles adsorb heavy hydrocarbons; passing a stream of natural gas to the vessel; and, recovering a dehydrated stream of natural gas from the vessel, wherein the dehydrated stream of natural gas has a lower amount of heavy hydrocarbons compared to the stream of natural gas. An embodiment of the invention is one, any or all of prior embodiments in this paragraph up through the first embodiment in this paragraph wherein the stream of natural gas comprises of less than 0.25 mole % C5+ hydrocarbons. An embodiment of the invention is one, any or all of prior embodiments in this paragraph up through the first embodiment in this paragraph wherein at least about 15%, by volume, of the first adsorbent particles are removed from the bed. An embodiment of the invention is one, any or all of prior embodiments in this paragraph up through the first embodiment in this paragraph wherein the second adsorbent particles also adsorb water. An embodiment of the invention is one, any or all of prior embodiments in this paragraph up through the first embodiment in this paragraph, wherein the first adsorbent particles comprise a molecular sieve adsorbent. An embodiment of the invention is one, any or all of prior embodiments in this paragraph up through the first embodiment in this paragraph, wherein the second adsorbent particles comprise an adsorbent selected from the group consisting of activated alumina, high silica zeolite, silica gel, activated carbon, molecular sieve or zeolite adsorbent. An embodiment of the invention is one, any or all of prior embodiments in this paragraph up through the first embodiment in this paragraph wherein the second adsorbent particles are placed into the vessel such that the second adsorbent particles are disposed on top of the first adsorbent particles. An embodiment of the invention is one, any or all of prior embodiments in this paragraph up through the first embodiment in this paragraph wherein the second adsorbent particles are placed into the vessel such that the second adsorbent particles are disposed below the first adsorbent particles. An embodiment of the invention is one, any or all of prior embodiments in this paragraph up through the first embodiment in this paragraph wherein the second adsorbent particles are placed into the vessel such that the second adsorbent particles are disposed between layers of the first adsorbent particles.

A second embodiment of the invention is a thermal swing adsorption process for removing heavy hydrocarbons and water from a stream of natural gas, the process comprising passing a stream of natural gas to a dehydration unit comprising at least one vessel surrounding a bed of first adsorbent particles; operating the vessel under conditions for selectively adsorbing water from the stream of natural gas for a first period of time; recovering a dehydrated stream of natural gas from the vessel; removing a portion of the first adsorbent particles from the bed of dehydration adsorbent particles in the vessel; placing a plurality of second adsorbent particles into the vessel, wherein the second adsorbent particles have a preferential selection for adsorbing heavy hydrocarbons; passing the stream of natural gas to the vessel; operating the vessel under conditions for selectively adsorbing heavy hydrocarbons and water from the stream of natural gas for a second period of time; and, recovering a dehydrated and hydrocarbon dew-pointed stream of natural gas from the vessel. An embodiment of the invention is one, any or all of prior embodiments in this paragraph up through the second embodiment in this paragraph wherein the second period of time comprises 15% less than the first period of time. An embodiment of the invention is one, any or all of prior embodiments in this paragraph up through the second embodiment in this paragraph wherein the second adsorbent particles also have a preferential selection for adsorbing water. An embodiment of the invention is one, any or all of prior embodiments in this paragraph up through the second embodiment in this paragraph wherein approximately 15%, by volume, of the first adsorbent particles are removed from the bed. An embodiment of the invention is one, any or all of prior embodiments in this paragraph up through the second embodiment in this paragraph, wherein the first adsorbent particles comprise a molecular sieve adsorbent. An embodiment of the invention is one, any or all of prior embodiments in this paragraph up through the second embodiment in this paragraph, wherein the second adsorbent particles comprise an adsorbent selected from the group consisting of activated alumina, high silica zeolite, silica gel, activated carbon, molecular sieve or zeolite adsorbent. An embodiment of the invention is one, any or all of prior embodiments in this paragraph up through the second embodiment in this paragraph wherein the stream of natural gas comprises less than 0.25 mole % C5+ hydrocarbons. An embodiment of the invention is one, any or all of prior embodiments in this paragraph up through the second embodiment in this paragraph, wherein the second adsorbent particles are placed into the vessel such that the second adsorbent particles are disposed on top of the first adsorbent particles. An embodiment of the invention is one, any or all of prior embodiments in this paragraph up through the second embodiment in this paragraph, wherein the second adsorbent particles are placed into the vessel such that the second adsorbent particles are disposed below the first adsorbent particles. An embodiment of the invention is one, any or all of prior embodiments in this paragraph up through the second embodiment in this paragraph, wherein the second adsorbent particles are placed into the vessel such that the second adsorbent particles are disposed between layers of the first adsorbent particles. An embodiment of the invention is one, any, or all of prior embodiments in this paragraph up through the second embodiment in this paragraph, further comprising at least one of sensing at least one parameter of the process and generating a signal or data from the sensing; generating and transmitting a signal; or generating and transmitting data.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A process for revamping an existing dehydration unit including at least one vessel surrounding a bed of first adsorbent particles, the first adsorbent particles having a preferential selection for adsorbing water, and the process comprising:
   removing a portion of the first adsorbent particles from the bed of dehydration adsorbent particles in the vessel;
   placing a portion of second adsorbent particles into the vessel, wherein the second adsorbent particles adsorb heavy hydrocarbons;
   passing a stream of natural gas to the vessel; and,
   recovering a dehydrated stream of natural gas from the vessel, wherein the dehydrated stream of natural gas has a lower amount of heavy hydrocarbons compared to the stream of natural gas.

2. The process of claim 1 wherein the stream of natural gas comprises of less than 0.25 mole % C5+ hydrocarbons.

3. The process of claim 1 wherein at least about 15%, by volume, of the first adsorbent particles are removed from the bed.

4. The process of claim 1 wherein the second adsorbent particles also adsorb water.

5. The process of claim 4, wherein the first adsorbent particles comprise a molecular sieve adsorbent.

6. The process of claim 5, wherein the second adsorbent particles comprise an adsorbent selected from the group consisting of: activated alumina, high silica zeolite, silica gel, activated carbon, molecular sieve or zeolite adsorbent.

7. The process of claim 1 wherein the second adsorbent particles are placed into the vessel such that the second adsorbent particles are disposed on top of the first adsorbent particles.

8. The process of claim 1 wherein the second adsorbent particles are placed into the vessel such that the second adsorbent particles are disposed below the first adsorbent particles.

9. The process of claim 1 wherein the second adsorbent particles are placed into the vessel such that the second adsorbent particles are disposed between layers of the first adsorbent particles.

10. A thermal swing adsorption process for removing heavy hydrocarbons and water from a stream of natural gas, the process comprising:
    passing a stream of natural gas to a dehydration unit comprising at least one vessel surrounding a bed of first adsorbent particles;
    operating the vessel under conditions for selectively adsorbing water from the stream of natural gas for a first period of time;
    recovering a dehydrated stream of natural gas from the vessel;
    removing a portion of the first adsorbent particles from the bed of dehydration adsorbent particles in the vessel;
    placing a portion of second adsorbent particles into the vessel, wherein the second adsorbent particles have a preferential selection for adsorbing heavy hydrocarbons, wherein the second adsorbent particles are disposed on top of the first adsorbent particles;
    passing the stream of natural gas to the vessel;
    operating the vessel under conditions for selectively adsorbing heavy hydrocarbons and water from the stream of natural gas for a second period of time; and,
    recovering a dehydrated and hydrocarbon dew-pointed stream of natural gas from the vessel.

11. The thermal swing adsorption process of claim 10 wherein the second period of time comprises 15% less than the first period of time.

12. The thermal swing adsorption process of claim 10 wherein the second adsorbent particles also have a preferential selection for adsorbing water.

13. The thermal swing adsorption process of claim 10 wherein approximately 15%, by volume, of the first adsorbent particles are removed from the bed.

14. The thermal swing adsorption process of claim 10, wherein the first adsorbent particles comprise a molecular sieve adsorbent.

15. The thermal swing adsorption process of claim 14, wherein the second adsorbent particles comprise an adsorbent selected from the group consisting of: activated alumina, high silica zeolite, silica gel, activated carbon, molecular sieve or zeolite adsorbent.

16. The thermal swing adsorption process of claim 10 wherein the stream of natural gas comprises less than 0.25 mole % C5+ hydrocarbons.

17. The thermal swing adsorption process of claim 10, wherein the second adsorbent particles are placed into the vessel such that the second adsorbent particles are disposed below the first adsorbent particles.

18. The thermal swing adsorption process of claim 10, wherein the second adsorbent particles are placed into the vessel such that the second adsorbent particles are disposed between layers of the first adsorbent particles.

19. The thermal swing adsorption process of claim 10, further comprising at least one of:
  sensing at least one parameter of the process and generating a signal or data from the sensing;
  generating and transmitting a signal; or
  generating and transmitting data.

* * * * *